(12) United States Patent
Tajima et al.

(10) Patent No.: US 12,139,007 B2
(45) Date of Patent: Nov. 12, 2024

(54) UTILITY VEHICLE

(71) Applicant: KAWASAKI MOTORS, LTD., Hyogo (JP)

(72) Inventors: Atsushi Tajima, Akashi (JP); Yoshihiko Inagaki, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/201,316

(22) Filed: May 24, 2023

(65) Prior Publication Data
US 2024/0092163 A1    Mar. 21, 2024

Related U.S. Application Data

(63) Continuation-in-part of application No. 17/232,834, filed on Apr. 16, 2021, now Pat. No. 11,698,048.

(51) Int. Cl.
*B60K 13/02* (2006.01)
*F02M 35/10* (2006.01)
*F16H 57/04* (2010.01)
*F16H 57/027* (2012.01)

(52) U.S. Cl.
CPC ....... *B60K 13/02* (2013.01); *F02M 35/10144* (2013.01); *F16H 57/0416* (2013.01); *F16H 57/027* (2013.01)

(58) Field of Classification Search
CPC ..... B60K 13/02; B01D 45/06; F16H 57/0416; F16H 57/027; F16H 57/0489; F02M 35/1014
See application file for complete search history.

(56) References Cited

U.S. PATENT DOCUMENTS

| 7,438,153 B2 * | 10/2008 | Kalsnes | B60K 17/34 180/908 |
| 2011/0139110 A1 * | 6/2011 | Miller | B01D 46/003 123/184.53 |
| 2012/0097463 A1 | 4/2012 | Iwata | |
| 2013/0192912 A1 * | 8/2013 | Shimomura | F02M 35/02416 55/385.3 |

(Continued)

FOREIGN PATENT DOCUMENTS

| JP | 2001-280204 | 10/2001 |
| JP | 2019-131044 | 8/2019 |
| VN | 1-0014869 | 1/2016 |

*Primary Examiner* — Syed O Hasan
(74) *Attorney, Agent, or Firm* — Wenderoth, Lind & Ponack, L.L.P.

(57) ABSTRACT

A utility vehicle including a body, a frame, an on-board device supplied with outside air, a chamber body having an intake space and divided into a first member disposed on a first side and opened to a second side and a second member detachably attached to the first member from the second side and opened to the first side, one of the first and second members having an engaging claw, and another one having an engaging portion, and a connecting pipe connecting the chamber body and the on-board device. The first member includes a first frame-shaped outer wall, a first tip surface, and a tip protrusion protruding from the first tip surface to the second side, and the second member includes a second frame-shaped outer wall, a second tip surface, and a tip recess recessed from the second tip surface toward the second side and fittable to the tip protrusion.

17 Claims, 8 Drawing Sheets

Back ⟵⟶ Front

(56) References Cited

U.S. PATENT DOCUMENTS

2015/0061275 A1* 3/2015 Deckard .............. B62D 21/183
  280/124.135
2017/0284346 A1   10/2017 Kontani
2019/0383248 A1   12/2019 Bouchard et al.
2020/0088143 A1*  3/2020 Hamada ................ B62K 11/02

* cited by examiner

Back ⟷ Front

Back ⟷ Front though the chamber body is formed of two divided members, it is possible to secure sealability between the two divided members while reducing increase in cost.

UTILITY VEHICLE

BACKGROUND OF THE INVENTION

Technical Field

The present disclosure relates to a utility vehicle.

Related Art

For example, the utility vehicle described in US Patent Publication No. 2019/0383248 includes an air intake system for supplying air to an engine. The air intake system includes a chamber body having an air intake port for sucking outside air.

SUMMARY

In a case where a chamber body is divided into two in a predetermined (first) direction, it is necessary to secure sealability between the two. However, when a sealing member is provided between the two, the number of components increases and the number of assembling steps increases, so that cost increases.

In view of the above, an object of the present disclosure is to provide a utility vehicle in which a chamber body is constituted by two divided members, and sealability between two divided members is secured while increase in cost is reduced.

In order to achieve the above object, according to an aspect of the present disclosure, there is provided a utility vehicle including:

a body;
a frame that supports the body;
an on-board device mounted on the frame and to which outside air is supplied;
a chamber body having an intake space defined inside, the chamber body being divided (separable) into two in a predetermined (first) direction into a first member disposed on a first side of the chamber body in the predetermined direction and opened to a second side opposite to the first side and a second member detachably attached to the first member from the second side and opened to the first side, one of the first member and the second member having an engaging claw for engaging the first member and the second member, and another one having an engaging portion engaged with the engaging claw; and a connecting pipe that connects the chamber body and the on-board device.

The first member includes a first frame-shaped outer wall portion defining a region on the first side in the intake space, a first tip surface that is an end surface on the second side of the first frame-shaped outer wall portion, and a tip protrusion protruding from the first tip surface to the second side, and the second member includes a second frame-shaped outer wall portion defining a region on the second side in the intake space, a second tip surface that is an end surface on the first side of the second frame-shaped outer wall portion, and a tip recess recessed from the second tip surface toward the second side and fittable to the tip protrusion.

According to such an aspect, while the chamber body is formed of two divided members, it is possible to secure sealability between the two divided members while reducing increase in cost.

BRIEF DESCRIPTION OF THE DRAWINGS

The foregoing and the other features of the present disclosure will become apparent from the following description and drawings of an illustrative embodiment of the disclosure in which.

DETAILED DESCRIPTION OF EMBODIMENTS

Figure 1:
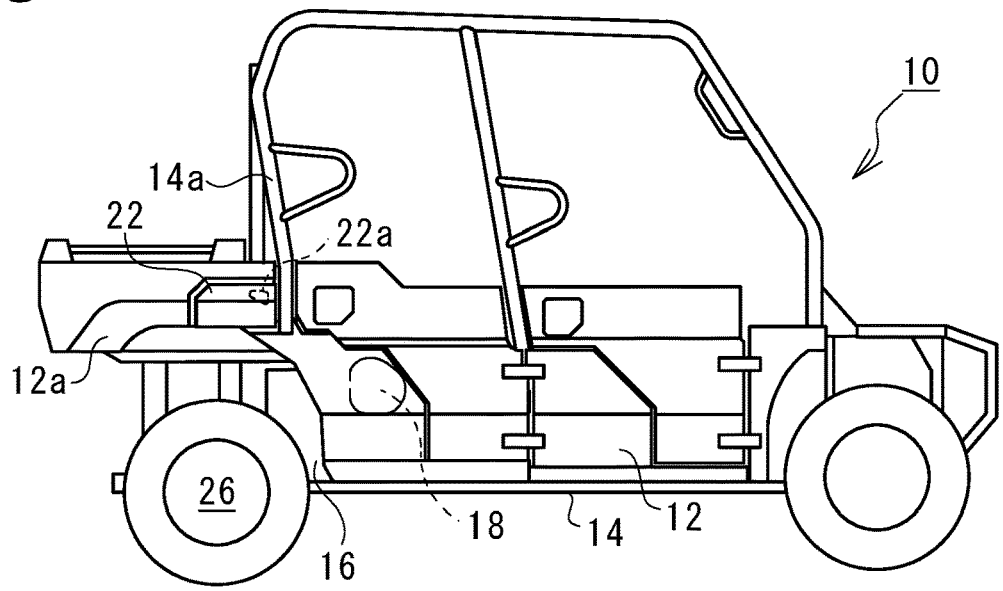
FIG. 1 is a right side view of a utility vehicle according to an embodiment of the present disclosure.

An embodiment of the present disclosure will be described below with reference to FIGS. 1 to 15. FIGS. 1 to 15 illustrate a utility vehicle according to an embodiment.

More detailed description than necessary may be omitted. In the drawings, parts not related to the present disclosure may be omitted for simplification. For example, detailed description of already well-known matters and duplicate description of substantially identical configurations may be omitted. This is to avoid unnecessary redundancy of the following description and to facilitate understanding of those skilled in the art.

The inventors provide the accompanying drawings and the following description so that those skilled in the art fully understand the present disclosure and do not intend the subject matter described in the claims to be limited by the accompanying drawings and the following description.

In addition, the terms "front," "rear," "left," and "right" as used herein are front, rear, left, and right sides for a driver of the utility vehicle, respectively.

FIG. 1 is a right side view of a utility vehicle 10 according to the embodiment.

As illustrated in FIG. 1, the utility vehicle 10 includes a body 12, a frame 14 that supports the body 12, an engine 16, which is an on-board device that is mounted on the frame 14 and requires outside air, and an air cleaner 18 that is connected to the engine 16 and removes foreign substances such as particles from the outside air taken into the engine 16. The engine 16 requires outside air because outside air is needed for driving of the engine 16.

Figure 2:
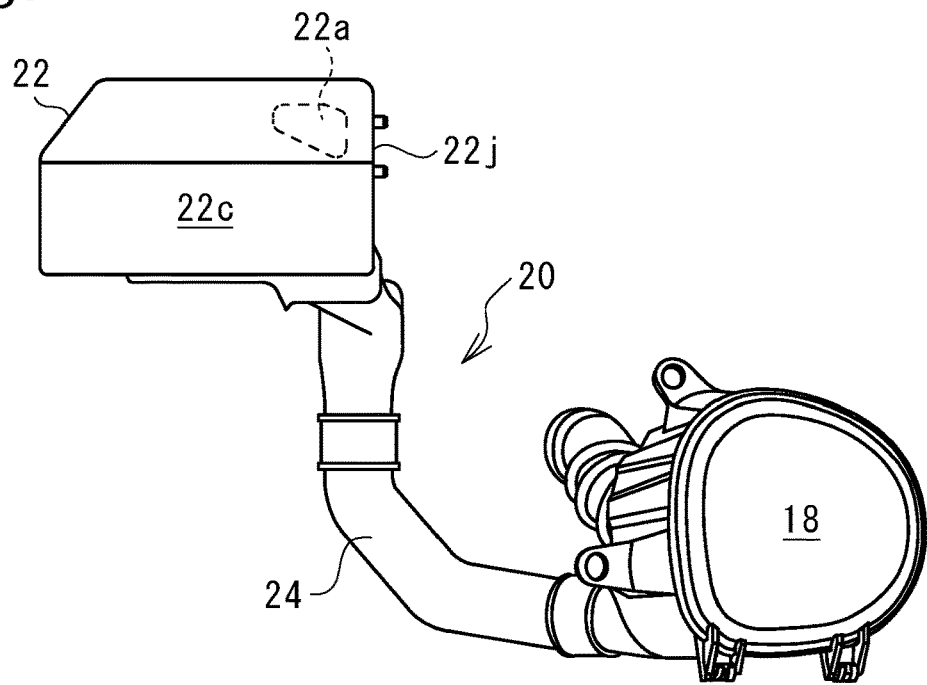
FIG. 2 is a perspective view of an air intake conduit for introducing outside air into an air cleaner.
Figure 3:
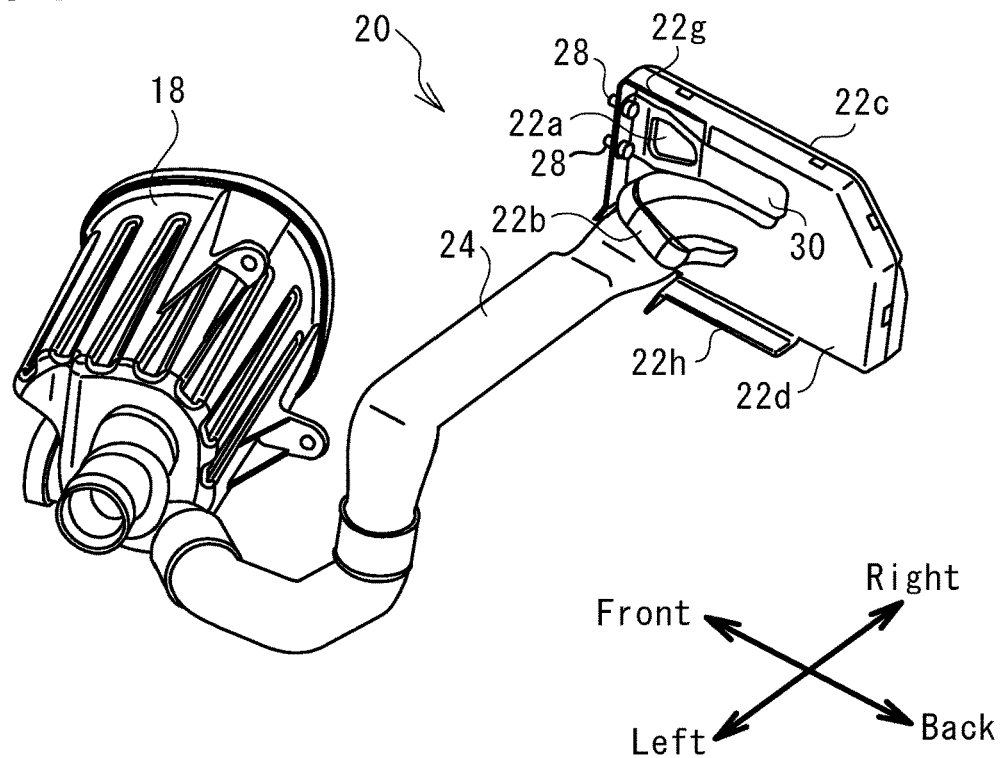
FIG. 3 is a perspective view of the air intake conduit for introducing outside air into the air cleaner, viewed from a different viewpoint from FIG. 2.

FIGS. 2 and 3 are perspective views of an air intake conduit for introducing outside air into the air cleaner, as viewed from different viewpoints.

As illustrated in FIGS. 2 and 3, the utility vehicle 10 has an air intake conduit 20 for introducing outside air into the air cleaner 18. In the present embodiment, the air intake conduit 20 includes a chamber body 22 for taking in outside air and a connecting pipe 24 for connecting the chamber body 22 and the air cleaner 18. As illustrated in FIGS. 2 and 3, the chamber body 22 constitutes one end of the air intake conduit 20. In the present embodiment, the chamber body 22 is made from a resin material and has a substantially rectangular parallelepiped shape, and includes an internal flow path IC (see FIG. 10), which will be described in detail later. Further, the chamber body 22 includes an air intake port 22a for sucking outside air into the internal flow path IC of the chamber body 22 and a connecting portion 22b for connecting the connecting pipe 24 and the chamber body 22.

Figure 4:
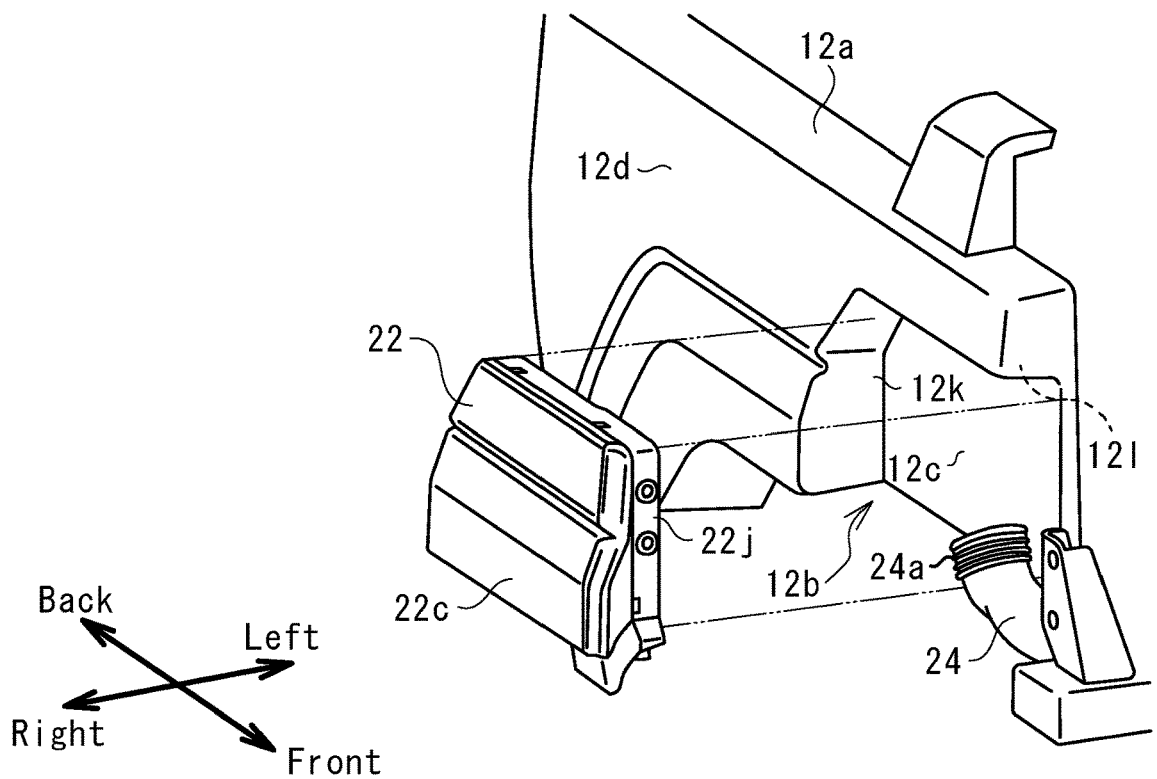
FIG. 4 is a perspective view of a part of the utility vehicle in a state where a chamber body of the air intake conduit is removed.

FIG. 4 is a perspective view of a part of the utility vehicle illustrating a state in which the chamber body of the air intake conduit has been removed.

In the present embodiment, a front side portion 22j of the chamber body 22 of the air intake conduit 20 is fixed to the frame 14, so that the chamber body 22 of the air intake conduit 20 is provided on a right side surface of the body 12 of the utility vehicle 10, as illustrated in FIGS. 1 and 4. This will be described in detail later. Specifically, in the present embodiment, the utility vehicle 10 includes a carrier. The chamber body 22 is disposed in a recess 12b formed in a carrier side cover 12a forming a right side surface of the carrier and located above a right rear wheel 26. The recess 12b is formed in the carrier side cover 12a so that front and bottom sides thereof in the utility vehicle 10 are opened.

The air intake port 22a of the chamber body 22 does not face an outward direction of the utility vehicle 10, as illustrated in FIGS. 1 and 2. That is, the air intake port 22a is not on an outer surface 22c of the chamber body 22. In the present specification, the utility vehicle 10 has a center (that is, a center in the front-rear direction, a left-right direction, and an up-down direction), and a direction toward the center is referred to as an "inward direction", and a direction away from the center is referred to as an "outward direction". Specifically, as illustrated in FIGS. 3 and 4, the recess 12b of the carrier side cover 12a is defined, and the air intake port 22a is formed in an inner surface 22d of the chamber body 22 that is opposite to a surface 12c facing a rightward direction (outward direction). In other words, the air intake port 22a is opened toward the inward direction in a vehicle width direction of the utility vehicle 10.

Figure 5:
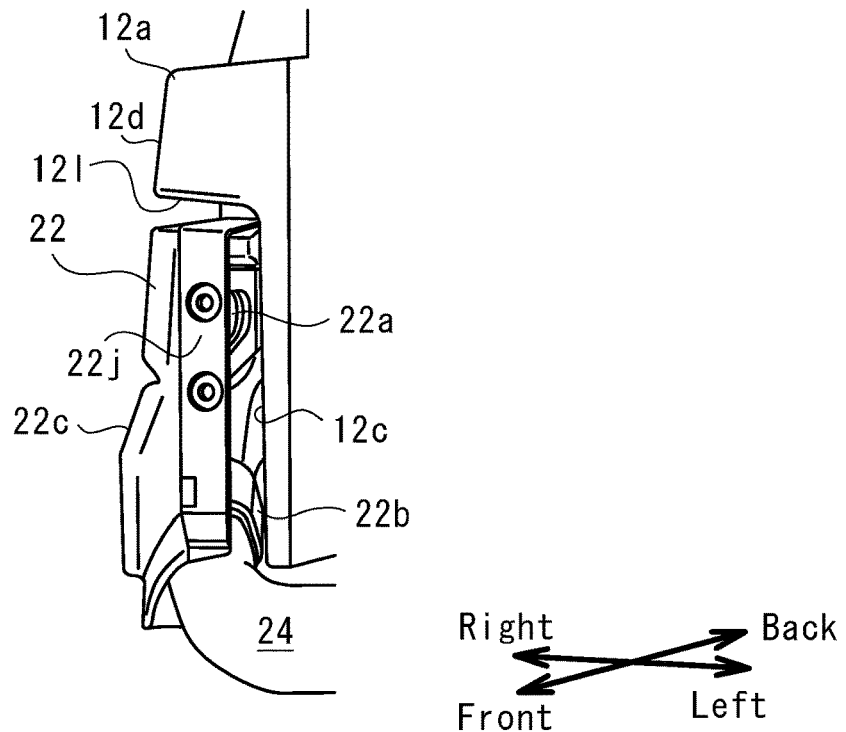
FIG. 5 illustrates a state in which the chamber body of the air intake conduit is disposed in a recess of a body and is a perspective view of a part of the utility vehicle viewed from a front side.

FIG. 5 illustrates a state in which the chamber body of the air intake conduit is disposed in the recess of the body and is a perspective view of a part of the utility vehicle viewed from the front side.

As illustrated in FIG. 5, the air intake port 22a is opened at least in the vehicle width direction (left-right direction) of the utility vehicle 10 and faces the center side (inward direction) in the vehicle width direction. In the present embodiment, the chamber body 22 is disposed on the right side surface of the body 12, and therefore the air intake port 22a faces at least the leftward direction. This can keep foreign substances such as mud and water from entering the air intake port 22a as compared with a case where the air intake port 22a faces the outward direction (rightward direction) of the utility vehicle 10.

Further, as illustrated in FIG. 5, the air intake port 22a of the chamber body 22 faces the surface 12c of the recess 12b of the carrier side cover 12a so that a gap is formed therebetween. In the present embodiment, the entire chamber body 22 is disposed in the recess 12b so that a gap is formed not only with the surface 12c but also with a surface 12k facing a frontward direction and a surface 12l facing a downward direction that define the recess 12b. This allows the air intake port 22a to suck in outside air that has entered the recess 12b from the front side while the utility vehicle 10 is traveling without being blocked by the carrier side cover 12a. The chamber body 22 is disposed in the recess 12b so as not to protrude from a side surface of the body 12, that is, a side surface 12d of the carrier side cover 12a in the front view or the rear view of the utility vehicle 10. This protects the chamber body 22 and does not impair design of the side surface of the body 12. In the present embodiment, in the chamber body 22, the outer surface 22c is formed to be substantially flush with the side surface 12d of the carrier side cover 12a. As a result, since a part of a design surface of a vehicle can be constituted by the chamber body 22, it is not necessary to provide another member for covering the chamber body 22 from the outer side in the vehicle width direction.

In the present embodiment, the air intake port 22a faces forward while facing leftward as described above so that air intake efficiency of the air intake port 22a improves, as illustrated in FIG. 5.

Figure 6:
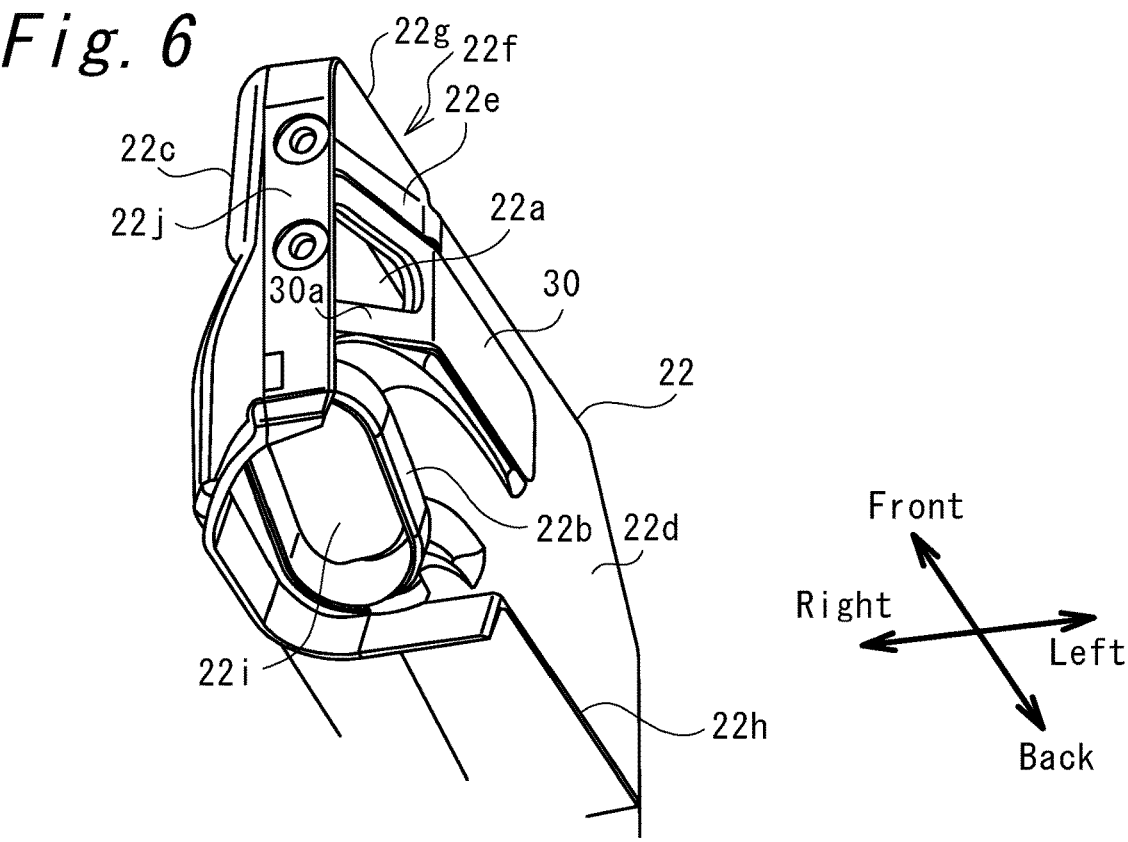
FIG. 6 is a perspective view of the chamber body viewed from below and inside a vehicle body.

FIG. 6 is a perspective view of the chamber body as viewed from below and inside the vehicle body.

As illustrated in FIG. 6, an inner surface 22d of the chamber body 22 has a recess 22f having a slope surface 22e. The slope surface 22e is an inclined surface that is inclined outward (rightward) in the vehicle width direction from the rear side to the front side of the utility vehicle 10. The air intake port 22a is formed in such a slope surface 22e, and therefore the air intake port 22a faces leftward and forward. This allows the air intake port 22a to suck in a large amount of outside air while the utility vehicle 10 is travelling as compared with a case where the air intake port 22a faces only leftward.

The utility vehicle 10 according to the present embodiment has a plurality of features for keeping foreign substances from entering the air intake port 22a.

First, as illustrated in FIG. 6, the chamber body 22 includes an eaves portion 22g in order to keep foreign substances from entering the air intake port 22a from above. The eaves portion 22g is provided above the air intake port 22a and projects toward the center in the vehicle width direction (leftward). By covering the air intake port 22a with the eaves portion 22g, foreign substances are kept from entering the air intake port 22a from above. The eaves portion 22g and the front side portion 22j are continuous with each other, and thereby foreign substances are also kept from entering the air intake port 22a from the front side.

Further, the chamber body 22 includes a mudguard portion 22h in order to keep foreign substances from entering the air intake port 22a from below. A shape and mounting features of the mudguard portion 22h will be described later.

Figure 7:
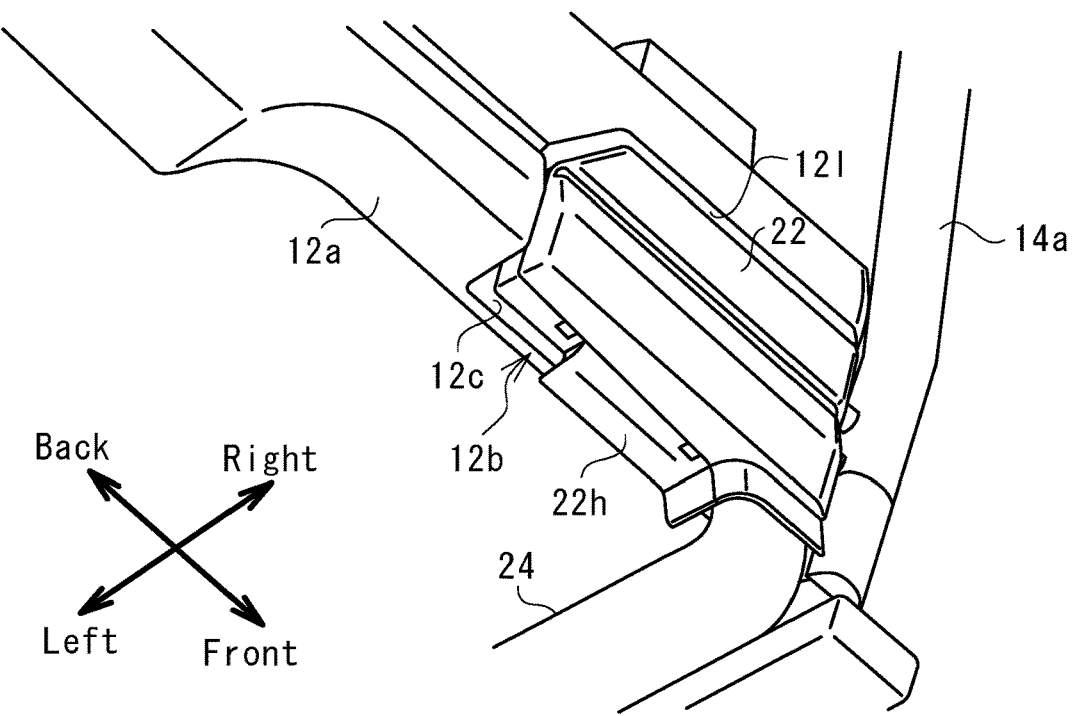
FIG. 7 illustrates a state in which the chamber body of the air intake conduit is disposed in the recess of the body and is a perspective view of a part of the utility vehicle viewed from below.

FIG. 7 illustrates a state in which the chamber body of the air intake conduit is disposed in the recess of the body and is a perspective view of a part of the utility vehicle viewed from below.

As illustrated in FIG. 7, there is a gap between the chamber body 22 and the surface 12c of the recess 12b of the carrier side cover 12a. Through this gap, mud from the ground may enter the air intake port 22*a* facing the surface 12*c* while the utility vehicle 10 is traveling.

In order to keep mud from the ground from entering the air intake port 22*a*, the plate-shaped mudguard portion 22*h* projects from a lower end of the chamber body 22 toward the side surface of the body 12, that is, the carrier side cover 12*a* so as to cover the gap between the chamber body 22 and the surface 12*c* of the recess 12*b* of the carrier side cover 12*a*.

The mudguard portion 22*h* may protrude not from the chamber body 22 but from the side surface of the body. The mudguard portion 22*h* may be made from resin and formed integrally with the chamber body 22. In addition, the mudguard portion 22*h* may be formed as a separate member, and in this case, the mudguard portion 22*h* may be made from rubber and attached to the chamber body 22 by a rivet or the like.

Such intrusion of mud from the ground into the air intake port 22*a* can occur when the wheels kick up the mud on the ground. In view of this, as illustrated in FIG. 1, the air intake port 22*a* is preferably provided on an upper portion of the chamber body 22 far from the ground in the side view of the body 12, and as for a positional relationship between the wheel and the air intake port 22*a*, the air intake port 22*a* is preferably disposed ahead of the wheel, considering the fact that mud is easily kicked up from the wheel from the front side toward the rear side of the vehicle body when the utility vehicle 10 is travelling forward. That is, the air intake port 22*a* is preferably located at least above (above and/or ahead of) the wheel (right rear wheel 26).

As described above, the chamber body 22 is disposed on the side surface of the body 12, that is, in the recess 12*b* of the carrier side cover 12*a* with a gap interposed therebetween so that the air intake port 22*a* can take in air while keeping foreign substances from entering the air intake port 22*a*. Therefore, the chamber body 22 is not supported by the carrier side cover 12*a*.

Figure 8:
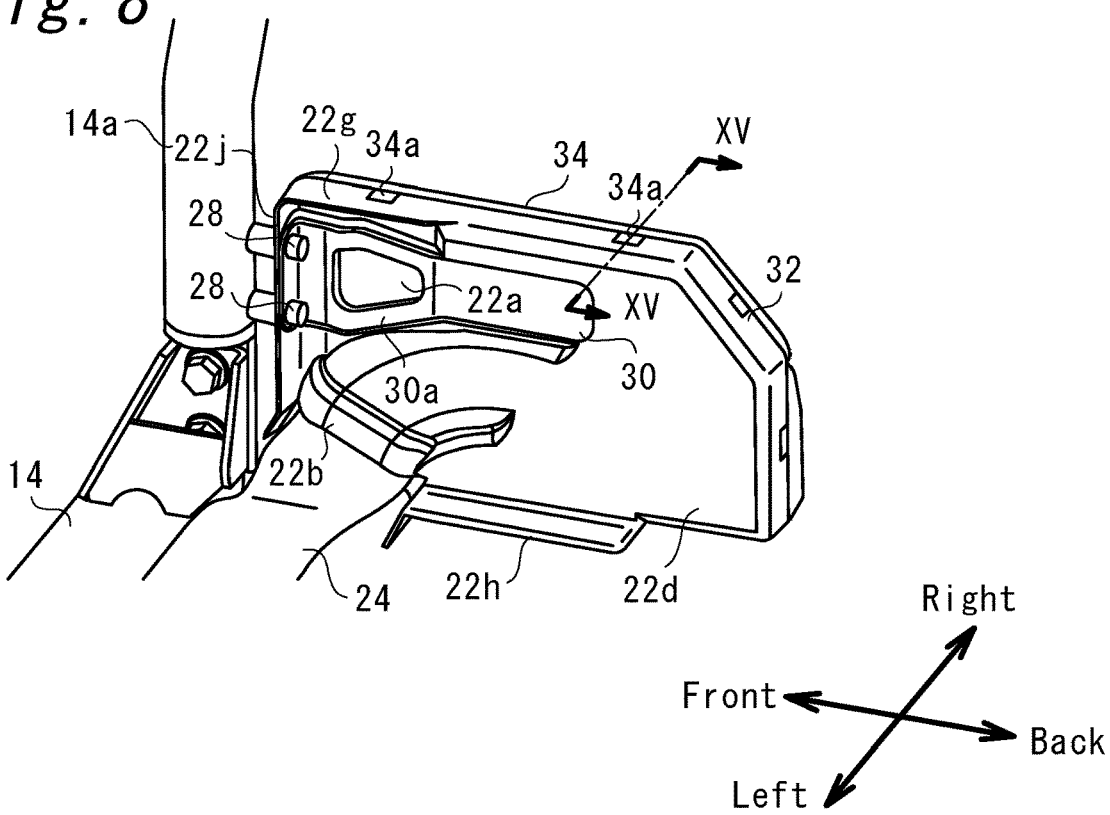
FIG. 8 is a perspective view of a part of the utility vehicle in a state where the chamber body of the air intake conduit is attached to a frame as viewed from an inner side of the vehicle body.

FIG. 8 is a perspective view of a part of the utility vehicle viewed from an inner side of the vehicle body and illustrates a state in which the chamber body of the air intake conduit has been attached to the frame.

As illustrated in FIG. 8, in the present embodiment, the chamber body 22 is fixed to the frame 14, specifically, a rear side pipe frame 14*a* included in a ROPS which is a part of the frame 14. Specifically, the chamber body 22 is fixed to the rear side pipe frame 14*a* at the front side portion 22*j* with use of a plurality of screws 28 and a bracket 30.

In the present embodiment, the bracket 30 is made of a metal material and is integrally incorporated into the chamber body 22. For example, the chamber body 22 and the bracket 30 are insert-molded. The bracket 30 partially improves the rigidity of the chamber body 22 made of the resin material. As a result, breakage of the chamber body 22 made of the resin material, particularly breakage of a portion fixed to the rear side pipe frame 14*a* with the use of the screws 28 is suppressed.

Further, in the present embodiment, the bracket 30 includes a ring portion 30*a* that supports and reinforces an edge portion of the air intake port 22*a*. Specifically, the bracket 30 is integrally incorporated into the chamber body 22 so that the ring portion 30*a* thereof overlaps the edge portion of the air intake port 22*a*. The ring portion 30*a* improves the rigidity of the edge portion of the air intake port 22*a* and suppresses abrasion of the edge portion of the air intake port 22*a* caused by sucked sand or stones. Note that, in place of the bracket 30, the chamber body 22 may be fastened to the rear side pipe frame 14*a* via a collar at a fastening portion by the screw 28. This also makes it possible to fix the chamber body 22 to the rear side pipe frame 14*a* while preventing buckling deformation of the chamber body 22 due to fastening of the screw 28.

A configuration of the chamber body 22 will be described below.

Figure 9:
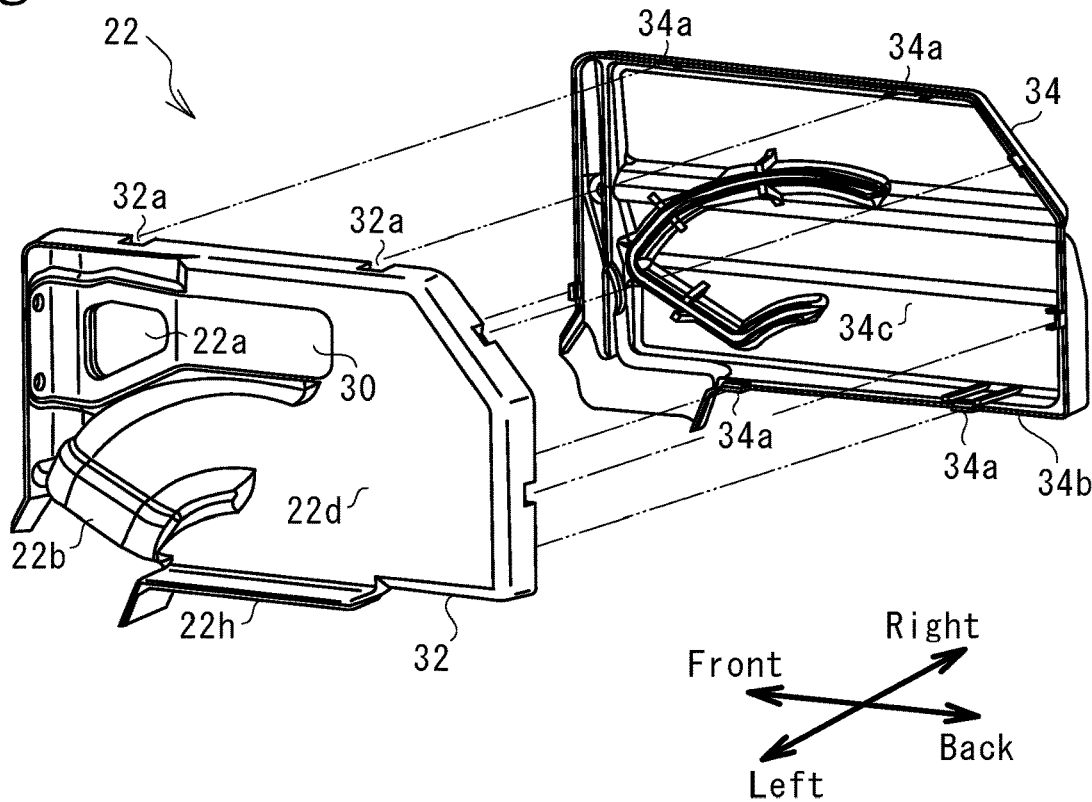
FIG. 9 is an exploded perspective view of the chamber body.
Figure 10:
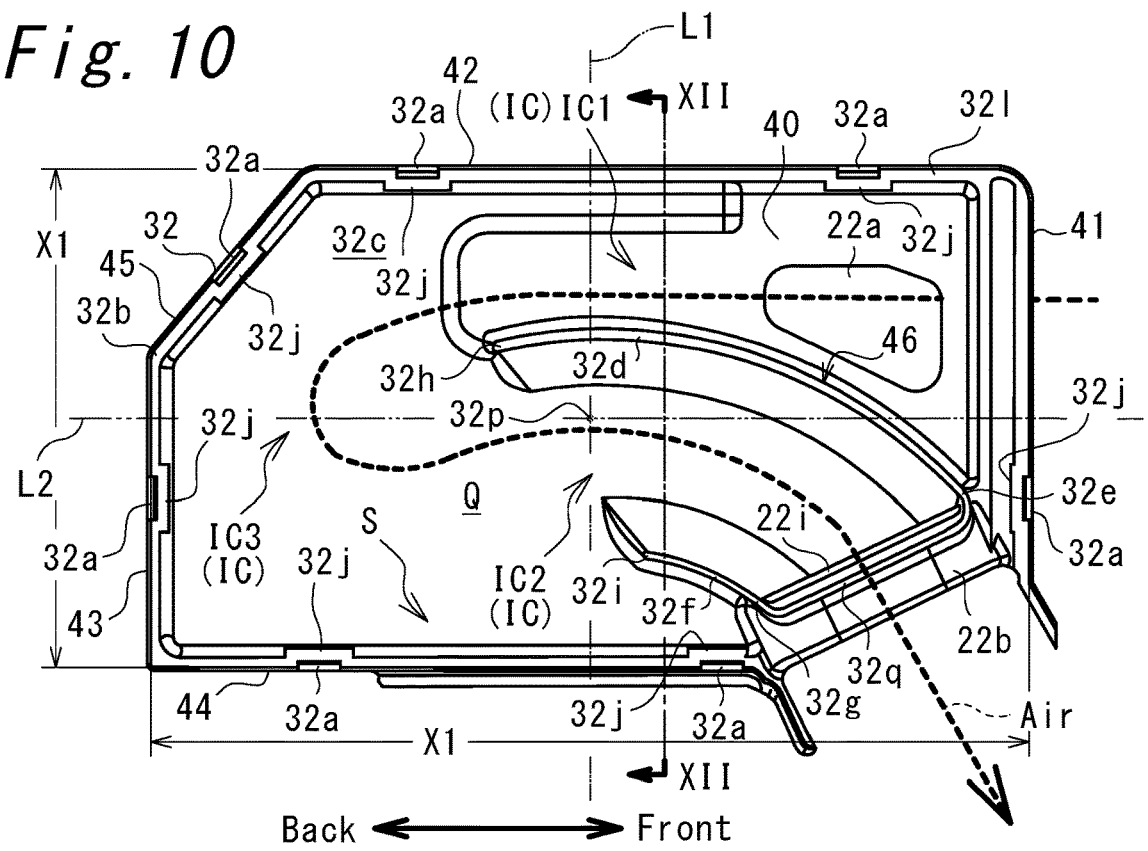
FIG. 10 illustrates an inner side of a first component of the chamber body.
Figure 11:
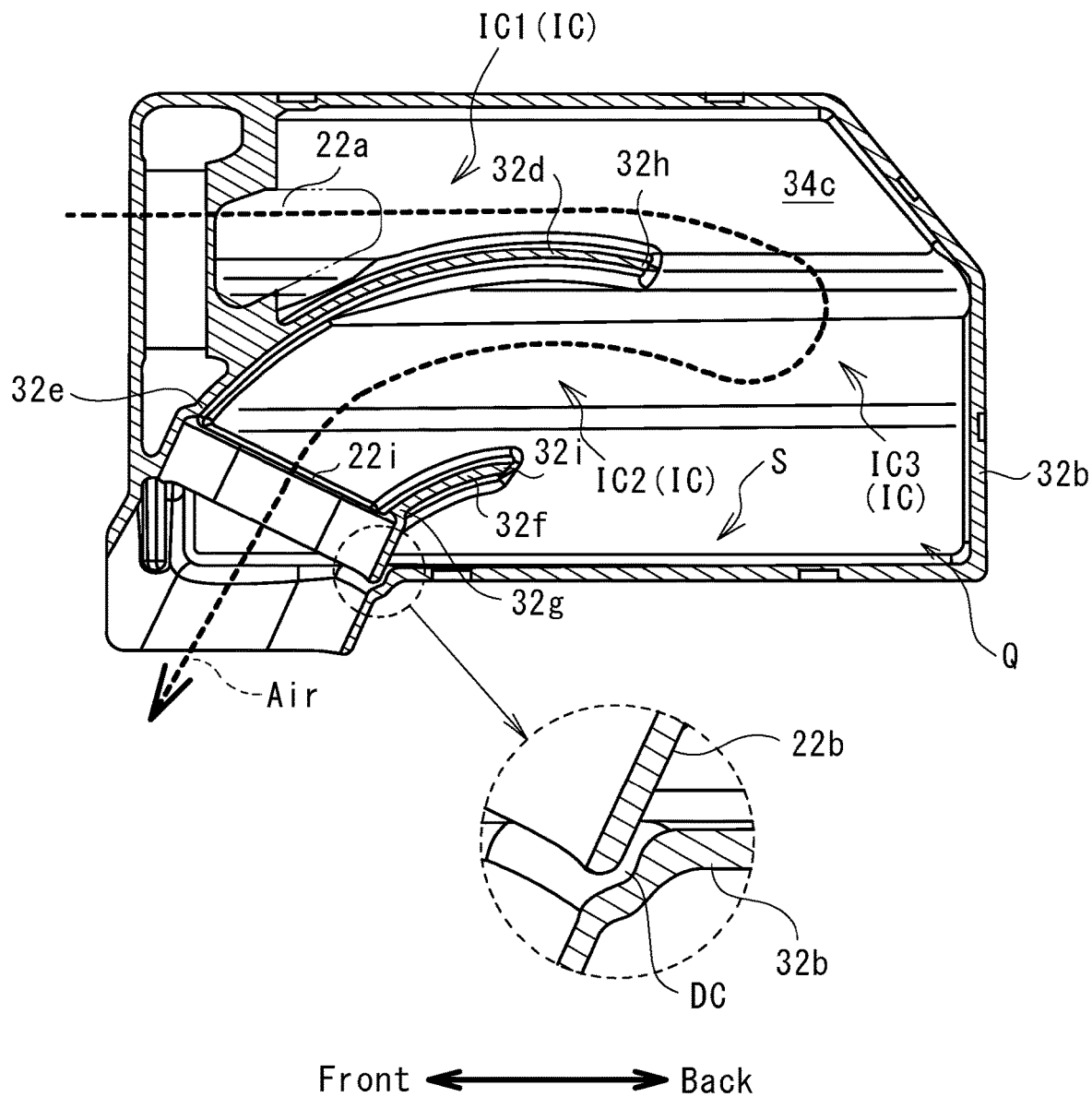
FIG. 11 is a cross-sectional view of the chamber body.

FIG. 9 is an exploded perspective view of the chamber body 22. Further, FIG. 10 is a view of a first member 32 of the chamber body 22, which will be described later, as viewed from an outer side in the vehicle body direction. Then, FIG. 11 is a cross-sectional view of the chamber body 22 taken along a plane that is parallel to a vehicle body front-rear direction and a vehicle body up-down direction, and viewed from an inner side in the vehicle width direction. In FIG. 11, only a cross section of the first member 32 is illustrated.

As illustrated in FIG. 9, in present embodiment, the chamber body 22 is divided into two members, the first member 32 disposed on a center side (left side) in the vehicle width direction and a second member 34 that is detachably attached on an outer side (right side) of the first member 32 in the vehicle width direction. The first member 32 is open outwardly in the vehicle width direction, and defines a region located inwardly in the vehicle width direction in an intake space Q (see FIG. 10) defined on an inner side of the chamber body 22. The second member 34 is open inwardly in the vehicle width direction, and defines a region located outwardly in the vehicle width direction in the intake space Q defined on an inner side of the chamber body 22.

Figure 14:
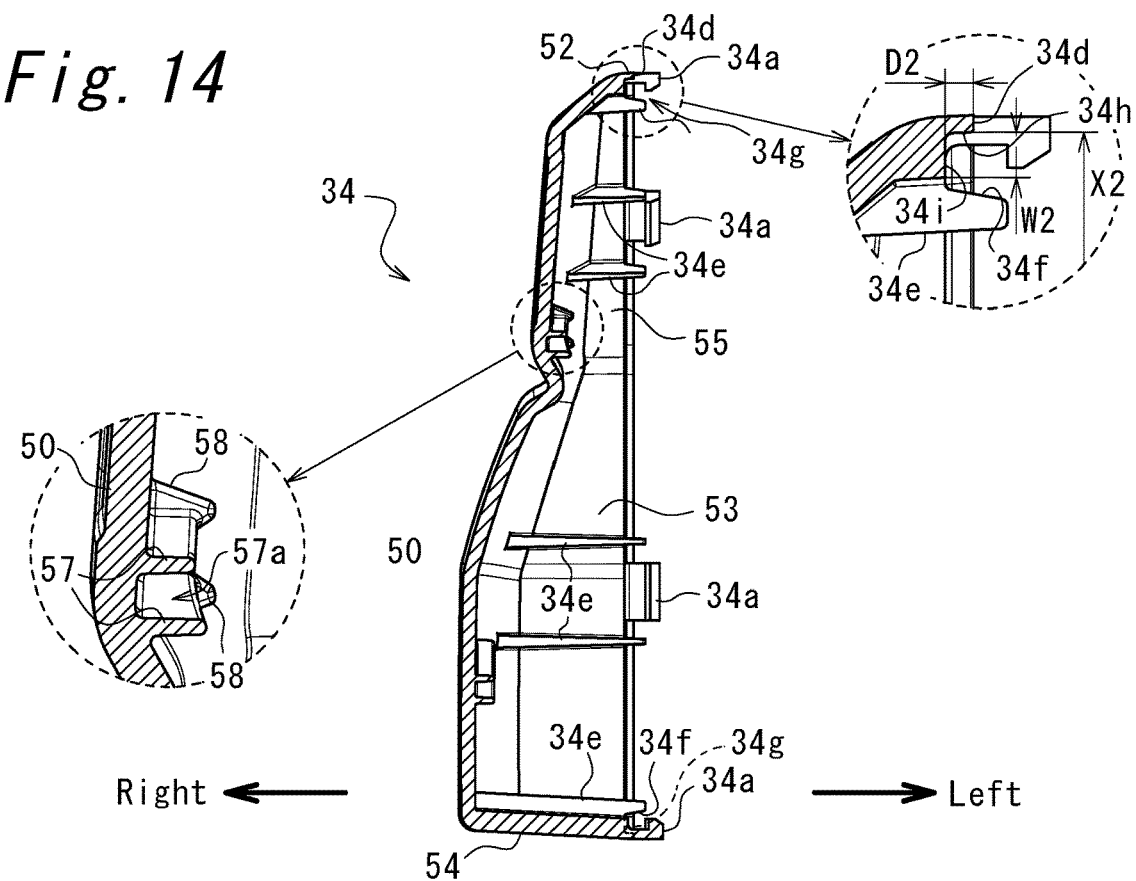
FIG. 14 is a cross-sectional view of the second component of the chamber body taken along line XIV-XIV of FIG. 13.
Figure 15:
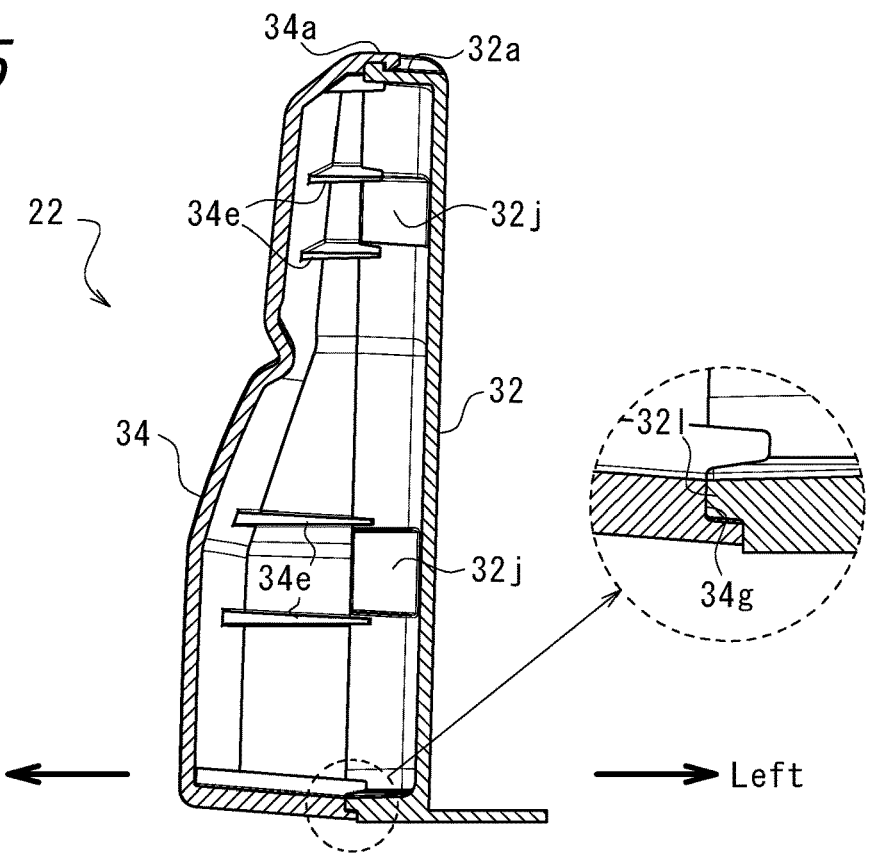
FIG. 15 is a cross-sectional view of the chamber body taken along line XV-XV of FIG. 8.

In the present embodiment, the first member 32 is fixed to the frame 14, specifically, the rear side pipe frame 14*a* with the use of the bracket 30. A portion of the first member 32 fixed to the rear side pipe frame 14*a* is the front side portion 22*j* of the chamber body 22. The second member 34 is detachably attached to such a first member 32. The second member 34 includes, for example, a plurality of engaging claws 34*a*. The second member 34 is detachably attached to the first member 32 by engaging the plurality of engaging claws 34*a* with corresponding engaging portions 32*a* of the first member 32. In particular, as shown in FIGS. 14 and 15, the engaging claw 34*a* has a claw portion extending in a second direction perpendicular to a predetermined first direction and towards an interior of the chamber body 22, the first direction being a direction in which the first member 32 and the second member 34 separate from each other. The engaging portion 32*a* has a recess which also extends in the second direction (i.e., the same direction in which the claw portion of the engaging claw 34*a* extends), and the claw portion of the engaging claw 34*a* is fitted within the recess of the engaging portion 32*a* in a direction towards the interior of the chamber body 22 when the engaging claw 34*a* engages the engaging portion 32*a*. Since the second member 34 is detachable from the first member 32 by disengagement of the engaging claw 34*a* from the engaging portion 32*a*, an inside of the chamber body 22 can be accessed without unfastening the screws 28 and removing the entire chamber body 22 from the rear side pipe frame 14*a*. This makes it possible to remove foreign substances that have infiltrated and accumulated in the chamber body 22 through the air intake port 22*a*.

In the present embodiment, the first member 32 is provided with the connecting portion 22*b* of the chamber body 22. As illustrated in FIG. 6, the connecting portion 22*b* has an annular shape, and one end 24*a* of the connecting pipe 24 illustrated in FIG. 4 is inserted into the connecting portion 22*b*. By inserting the one end 24*a* of the connecting pipe 24 into the connecting portion 22*b*, a connecting port 22*i* of the chamber body 22 that is formed in the first member 32 and communicating with the internal flow path IC of the chamber body 22 communicates with the air cleaner 18 via the connecting pipe 24.

Through cooperation between the first member 32 and the second member 34 attached to the first member 32, specifically, through engagement between a frame-shaped outer wall portion 32b of the first member 32 that protrudes toward the second member 34 and a frame-shaped outer wall portion 34b of the second member 34 that protrudes toward the first member 32, the internal flow path IC of the chamber body 22, which is a space, is formed between the first member 32 and the second member 34.

FIG. 10 is a side view of the first member 32 as viewed from an outer side in the vehicle width direction. As illustrated in FIG. 10, the first member 32 includes an inner wall portion 40 located inwardly in the vehicle width direction and extending along the vehicle body front-rear direction and the vehicle body up-down direction, and a first flow path wall 46 erected outwardly in the vehicle width direction from the inner wall portion 40 and constituting the internal flow path IC to be described later. The frame-shaped outer wall portion 32b extends outwardly in the vehicle width direction from a peripheral edge portion of the inner wall portion 40. The first flow path wall 46 will be described later.

In the present embodiment, the frame-shaped outer wall portion 32b includes a front wall portion 41 extending along the vehicle body up-down direction at a front end, an upper wall portion 42 extending from an upper end portion of the front wall portion 41 to a rear side in the vehicle body front-rear direction, a rear wall portion 43 extending along the vehicle body up-down direction at a rear end portion, a lower wall portion 44 extending from a lower end portion of the rear wall portion 43 to a front side in the vehicle body front-rear direction, and an inclined wall portion 45 extending in a direction inclined upward in the vehicle body up-down direction toward a front side in the vehicle body front-rear direction between a rear end portion of the upper wall portion 42 and an upper end portion of the rear wall portion 43 and connecting the rear end portion of the upper wall portion 42 and the upper end portion of the rear wall portion 43. The first member 32 has a rectangular shape that is long in the vehicle body front-rear direction when viewed from an outer side in the vehicle width direction, and the upper wall portion 42 and the lower wall portion 44 are longer than the front wall portion 41, the rear wall portion 43, and the inclined wall portion 45 in an extending direction thereof.

The front wall portion 41 constitutes a front side portion 22j of the chamber body 22. That is, the chamber body 22 is fixed to the rear side pipe frame 14a at the front wall portion 41 of the first member 21. The connecting portion 22b of the chamber body 22 is located between a lower end portion of the front wall portion 41 and a front end of the lower wall portion 44.

The engaging portion 32a is provided on each of the frame-shaped outer wall portions 32b. In the present embodiment, two of the engaging portions 32a are provided on each of the upper wall portion 42 and the lower wall portion 44 which are configured to be long in an extending direction, and one of the engaging portion 32a is provided on each of the front wall portion 41, the rear wall portion 43, and the inclined wall portion 45 which are the other wall portions. The engaging portion 32a provided on the front wall portion 41 is located adjacent to the connecting portion 22b of the front wall portion 41 and close to a lower end portion. One of the engaging portions 32a provided in the lower, wall portion 44 located on a front side is located close to a front end adjacent to the connecting portion 22b.

Each of the engaging portions 32a is formed by recessing each outer peripheral surface of the frame-shaped outer wall portion 32b toward an inner peripheral surface side. For this reason, a protruding portion 32j protruding inwardly at a position corresponding to the engaging portion 32a is formed on an inner peripheral surface of the frame-shaped outer wall portion 32b.

Figure 12:
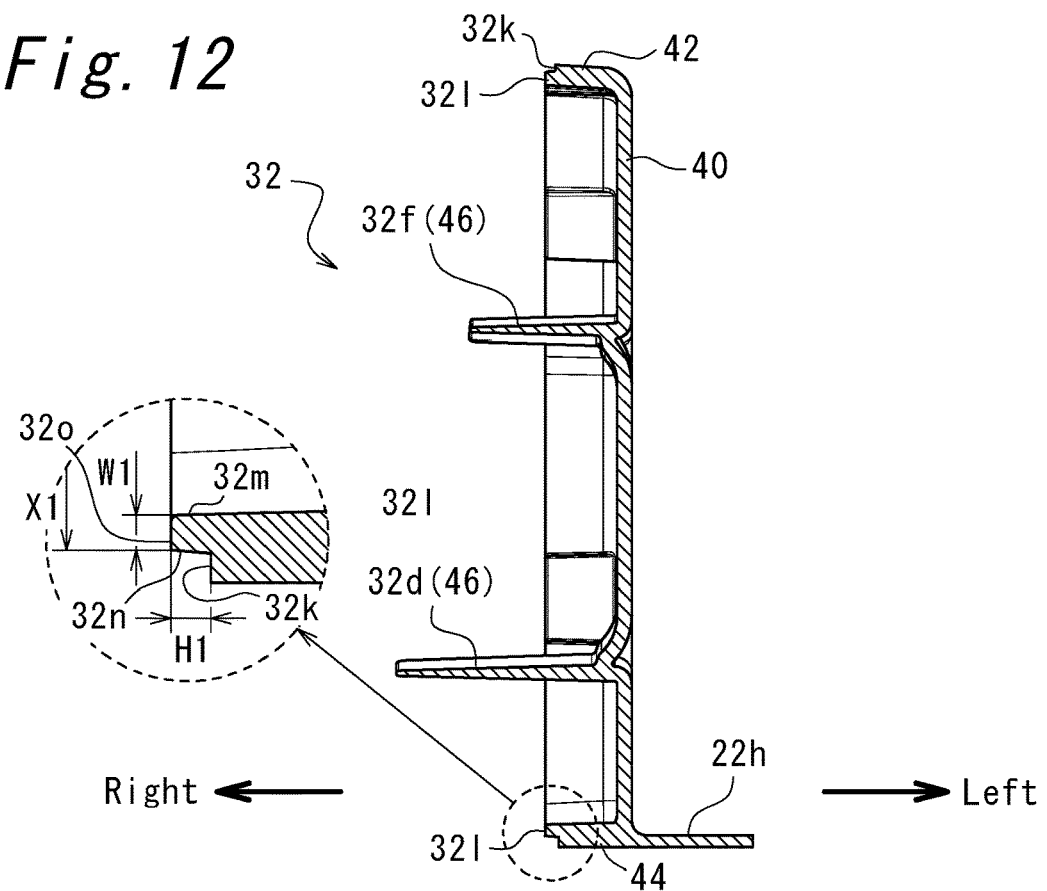
FIG. 12 is a cross-sectional view of the first component of the chamber body taken along line XII-XII of FIG. 10.

FIG. 12 is a cross-sectional view taken along the vehicle body up-down direction and the vehicle width direction of the first member 32 taken along line XII-XII of FIG. 10. As illustrated in FIG. 12, a tip protrusion 32l protruding outwardly in the vehicle width direction is formed on a tip surface 32k located at an outer end potion in the vehicle width direction of the frame-shaped outer wall portion 32b. Referring also to FIG. 10, the tip protrusion 32l is formed along the frame-shaped outer wall portion 32b. That is, the tip protrusion 32l continuously extends along the tip surface 32k of each of the front wall portion 41, the upper wall portion 42, the inclined wall portion 45, the rear wall portion 43, and the lower wall portion 44.

The tip protrusion 32l includes a protrusion inner surface 32m located closer to an inner peripheral surface and extending in the vehicle width direction, a protrusion outer surface 32n located closer to an outer peripheral surface and extending in the vehicle width direction, and a protrusion tip surface 32o connecting outer end portions in the vehicle width direction of the protrusion inner surface 32m and the protrusion outer surface 32n, and has a rectangular cross-sectional shape. In the present embodiment, the tip protrusion 32l is provided closer to an inner peripheral surface of the first member 32 in the tip surface 32k. Specifically, the protrusion inner surface 32m is flush with an inner peripheral surface of the frame-shaped outer wall portion 32b, and the protrusion outer surface 32n is located closer to an inner peripheral surface than an outer peripheral surface of the frame-shaped outer wall portion 32b.

The tip protrusion 32l has a protrusion width W1 which is a dimension between the protrusion inner surface 32m and the protrusion outer surface 32n, and a protrusion height H1 which is a height from the tip surface 32k to the protrusion tip surface 32o. Referring also to FIG. 10, the first member 32 has an outer width dimension X1 which is a dimension between the protrusion outer surface 32n of a pair of the tip protrusions 32l facing each other with a center position 32p of the first member 32 interposed between them. The center position 32p may be a center of figure or a center of gravity of the first member 32 in plan view, or may be an intersection of a front-rear imaginary center line L1 between the front wall portion 41 and the rear wall portion 43 and an up-down imaginary center line L2 between the upper wall portion 42 and the lower wall portion 44 in plan view. Note that the outer width dimension X1 varies in length according to a position to be measured.

Figure 13:
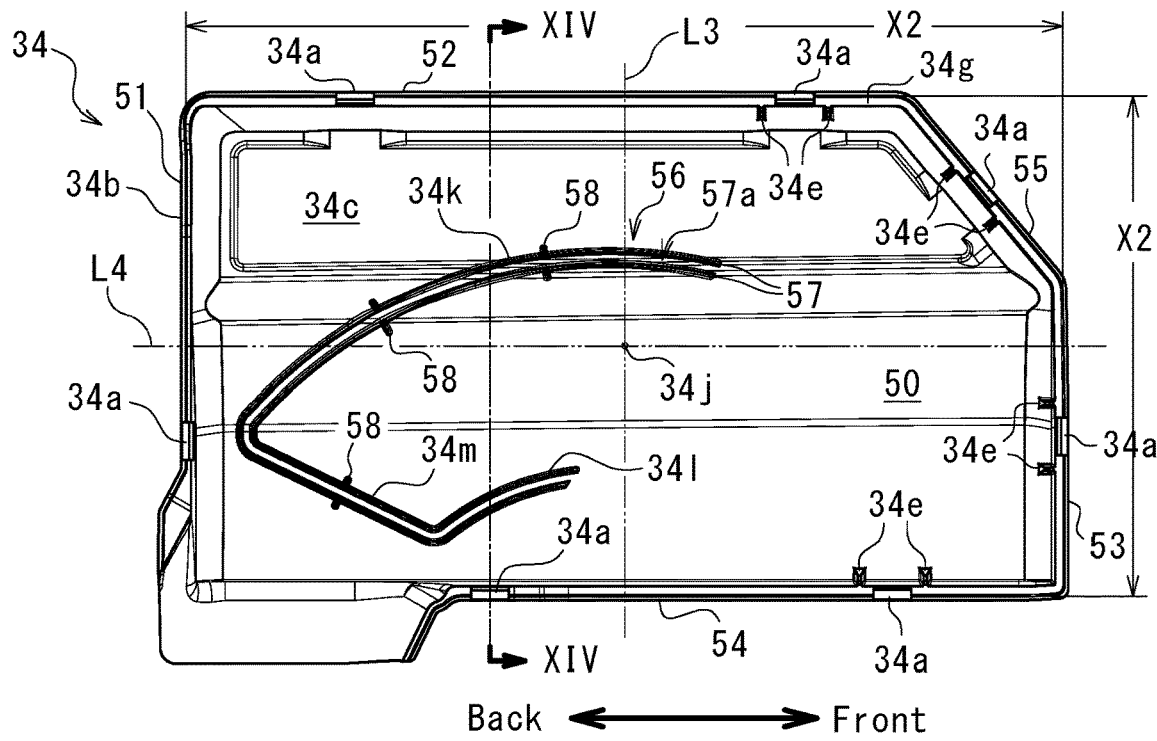
FIG. 13 illustrates an inner side of a second component of the chamber body.

FIG. 13 is a side view of the second member 34 as viewed from an inner side in the vehicle width direction. As illustrated in FIG. 13, the second member 34 includes an outer wall portion 50 located outwardly in the vehicle width direction and extending along the vehicle body front-rear direction and the vehicle body up-down direction, and a second flow path wall 56 erected inwardly in the vehicle width direction from the outer wall portion 50. The frame-shaped outer wall portion 34b extends inwardly in the vehicle width direction from a peripheral edge portion of the outer wall portion 50. Although the second flow path wall 56 will be described later, the internal flow path IC extending from the intake port 22a to the connecting port 22i is constituted on an inner side of the chamber body 22 in cooperation with the first flow path wall 46.

In the present embodiment, the frame-shaped outer wall portion 34b corresponds to the frame-shaped outer wall portion 32b, and includes a front wall portion 51 extending along the vehicle body up-down direction at a front end, an upper wall portion 52 extending from an upper end portion of the front wall portion 51 to a rear side in the vehicle body front-rear direction, a rear wall portion 53 extending along the vehicle body up-down direction at a rear end portion, a lower wall portion 54 extending from a lower end portion of the rear wall portion 53 to a front side in the vehicle body front-rear direction, and an inclined wall portion 55 extending in a direction inclined upward in the vehicle body up-down direction toward a front side in the vehicle body front-rear direction between a rear end portion of the upper wall portion 52 and an upper end portion of the rear wall portion 53.

The engaging claw 34a is provided on each of the frame-shaped outer wall portions 34b corresponding to the engaging portion 32a. In the present embodiment, two of the engaging claws 34a are provided on each of the upper wall portion 52 and the lower wall portion 54 which are configured to be long in an extending direction, and one of the engaging claw 34a is provided on each of the front wall portion 51, the rear wall portion 53, and the inclined wall portion 55 which are the other wall portions.

FIG. 14 is a cross-sectional view along the vehicle body up-down direction and the vehicle width direction of the second member 34 taken along line XIV-XIV in FIG. 13. As illustrated in FIG. 14, the engaging claw 34a is located closer to an outer surface of a tip surface 34d located at an inner end portion in the vehicle width direction of the frame-shaped outer wall portion 34b. Specifically, a surface on an outer periphery side of the engaging claw 34a is flush with an outer peripheral surface of the frame-shaped outer wall portion 34b, and does not protrude further outwardly than the frame-shaped outer wall portion 34b in plan view. With this arrangement, the second member 34 has a planar shape with no unevenness at an outer peripheral edge portion when viewed from an outer side in the vehicle width direction, so that deterioration in appearance due to the engaging claw 34a is prevented in a case where the second member 34 constitutes a design surface.

As illustrated in FIG. 13, the second member 34 further includes a guide 34e closer to an inner peripheral surface at a position corresponding to the engaging claw 34a provided on each of a rear side of the upper wall portion 52, the inclined wall portion 55, the rear wall portion 53, and a rear side of the lower wall portion 54. A pair of the guides 34e are provided adjacent to both sides of each of the engaging claws 34a in a direction along an inner peripheral surface of each wall portion in plan view.

As illustrated in FIG. 14, each of the guides 34e is erected inwardly from the frame-shaped outer wall portion 34b, extends outwardly in the vehicle width direction along a protruding direction of the engaging claw 34a, and has a tip portion protruding further inwardly in the vehicle width direction from the tip surface 34d of the frame-shaped outer wall portion 34b. The guide 34e has a slope surface 34f at a portion facing an outer peripheral side in a portion protruding from the tip surface 34d. The slope surface 34f is inclined inwardly in the vehicle width direction in a direction away from an inner peripheral surface (to an inner side in plan view).

On the tip surface 34d of the frame-shaped outer wall portion 34b, a tip recess 34g recessed outwardly in the vehicle width direction is formed. Referring also to FIG. 13, the tip recess 34g is formed along the frame-shaped outer wall portion 34b. That is, the tip recess 34g continuously extends along the tip surface 34d of each of the front wall portion 51, the upper wall portion 52, the inclined wall portion 55, the rear wall portion 53, and the lower wall portion 54.

The tip recess 34g has a recess outer surface 34h located closer to an outer peripheral surface and extending in the vehicle width direction, and a recess bottom surface 34i extending in a plane parallel to the vehicle body up-down direction and the vehicle body front-rear direction from an outer end portion in the vehicle width direction of the recess outer surface 34h and reaching an inner peripheral surface, and has an L-shaped cross-sectional shape. That is, in the present embodiment, the tip recess 34g is provided closer to an inner peripheral surface of the second member 34 in the tip surface 34d, and is open inwardly in the vehicle width direction and an inner peripheral side. Specifically, the recess outer surface 34h is located closer to an inner peripheral surface than an outer peripheral surface of the frame-shaped outer wall portion 34b.

The tip recess 34g has a recess width W2 which is a dimension between the recess outer surface 34h and an inner peripheral surface of the second member 34, and a recess depth D2 which is a dimension from the tip surface 34d to the recess bottom surface 34i. Further, referring also to FIG. 13, the second member 34 has an outer width dimension X2 which is a dimension between the recess outer surfaces 34h of a pair of the tip recesses 34g facing each other with a center position 34j of the second member 34 interposed between them. The center position 32p may be a center of figure or a center of gravity of the second member 34 in plan view, or may be an intersection of a front-rear imaginary center line L3 between the front wall portion 51 and the rear wall portion 53 and an up-down imaginary center line L4 between the upper wall portion 52 and the lower wall portion 54 in plan view. Note that the outer width dimension X2 varies in length depending on a position to be measured.

FIG. 15 is a cross-sectional view along the vehicle width direction and the vehicle body up-down direction of the chamber body 22 taken along line XV-XV of FIG. 8. As illustrated in FIG. 15, the second member 34 is detachably attached to the first member 32 as the engaging claw 34a is engaged with the engaging portion 32a in a state where the tip protrusion 32l of the first member 32 is fitted into the tip recess 34g of the second member 34.

Here, the outer width dimension X1 at an optional position of the tip protrusion 32l is smaller than the outer width dimension X2 of the tip recess 34g at a corresponding position. However, the outer width dimension X1 of the tip protrusion 32l at an optional position may be larger than the outer width dimension X2 of the tip recess 34g at a corresponding position. In this case, the tip protrusion 32l is fitted into the tip recess 34g while being strongly pressed against the recess outer surface 34h of the tip recess 34g. In this state, the tip protrusion 32l and the tip recess 34g are fitted to each other while both or at least one of the protrusion outer surface 32n and the recess outer surface 34h is elastically deformed, so that a seal portion is formed between them.

Note that, in the present embodiment, the first member 32 has higher rigidity than the second member 34. Specifically, while the first member 32 is made from a glass fiber-reinforced polyamide material (hereinafter referred to as GF material), the second member 34 is made from a polypropylene material (hereinafter referred to as PP material) having lower rigidity than a GF material. That is, in the present embodiment, while the first member 32 fixed to the rear side pipe frame 14a is made from a GF material having high rigidity, the second member 34 which is located outwardly in the vehicle width direction, constitutes a design surface, and is attached to the first member 32 is made from a PP material having relatively low rigidity. Therefore, the second member 34 is deformed and attached along the first member 32.

Further, a GF material is more likely to have a resin molding mark due to resin flow at the time of resin molding than a PP material, but in the present embodiment, since the first member 32 is located inwardly in the vehicle width direction, deterioration in appearance due to a resin molding mark that may occur in the first member 32 can be prevented. On the other hand, the second member 34 constituting a design surface is made from a PP material in which a resin molding mark is less likely to occur as compared with a GF material, and deterioration in appearance by the second member 34 is reduced because a resin molding mark is less likely to occur.

Further, the protrusion width W1 of the tip protrusion 32l is substantially equal to the recess width W2 of the tip recess 34g. The protrusion width W1 and the recess width W2 are, for example, about 2.8 mm or more and about 3.0 mm or less. With this arrangement, a seal portion having an appropriate length can be formed between the protrusion tip surface 32o and the recess bottom surface 34i.

The protrusion height H1 of the first member 32 is set to be equivalent to the recess depth D2 of the second member 34. However, the protrusion height H1 of the first member 32 may be larger than the recess depth D2 of the second member 34. Specifically, in a state where the tip protrusion 32l and the tip recess 34g are fitted, while the protrusion tip surface 32o and the recess bottom surface 34i abut on each other to form a seal portion between them, the tip surface 32k of the first member 32 and the tip surface 34d of the second member 34 make a zero touch. However, the protrusion height H1 and the recess depth D2 may be set such that a slight gap is provided between the protrusion tip surface 32o and the recess bottom surface 34i. With this arrangement, since the tip surface 32k of the first member 32 can be reliably caused to abut on the tip surface 34d of the second member 34, sealability between them can be further improved. The recess depth D2 is, for example, about 2 mm. With this arrangement, a crank-like mating surface can be formed with an appropriate length between the protrusion 32l and the recess 34g.

In a case where the outer width dimension X1 of the tip protrusion 32l is made larger than the outer width dimension X2 of the tip recess 34g, the outer width dimension X1 of the tip protrusion 32l only needs to be set to be large at about 0.5% or more and about 2.0% or less with respect to the outer width dimension X2 of the tip recess 34g at least at any measurement position as a guide. When the outer width dimension X1 is about 0.5% or more with respect to the outer width dimension X2, a press-fitting allowance due to fitting between the tip protrusion 32l and the tip recess 34g is secured, so that a seal portion can be appropriately configured. If the outer width dimension X1 is larger than 2.0% with respect to the outer width dimension X2, a press-fitting allowance due to fitting between the tip protrusion 32l and the tip recess 34g becomes excessively large, so that the fitting may be difficult to be performed.

Further, in a state where the second member 34 is attached to the first member 32, a pair of the guides 34e of the second member 34 are located on both sides of the protruding portion 32j of the first member 32. According to the guide 34e, when the second member 34 is attached to the first member 32, the slope surface 34f of the guide 34e is disposed along an inner peripheral surface of the first member 32, so that the both members can be easily aligned. Further, when the engaging claw 34a is engaged with the engaging portion 32a, the frame-shaped outer wall portion 32b pressed toward an inner peripheral surface side by the engaging claw 34a can be supported from an inner peripheral surface side by a pair of the guides 34e adjacent to both sides of the engaging claw 34a, so that excessive deformation of the engaging portion 32a toward an inner peripheral surface side is prevented, and the engaging claw 34a can be reliably engaged with the engaging portion 32a.

Furthermore, in a state where the second member 34 is attached to the first member 32, the second member 34 is located closer to an outer peripheral surface than the first member 32 except for the mudguard portion 22h. In other words, when viewed from an outer side in the vehicle width direction, the second member 34 is one size larger than the first member 32, and the first member 32 cannot be visually recognized. For example, an outer shape of the second member 34 is at least 0.2 mm larger than the first member 32. The mudguard portion 22h, which is located on a lower side and closer to an inner side in the vehicle width direction of the chamber body 22, is less noticeable when viewed in a side view, particularly from above. With this arrangement, an outer peripheral portion of the chamber body 22 can be easily made neat while the chamber body 22 is divided (separable) into two in the vehicle width direction, and deterioration in appearance can be prevented.

Next, the internal flow path IC of the chamber body 22 will be described.

As illustrated in FIGS. 10 and 11, in the present embodiment, the internal flow path IC of the chamber body 22 includes an upstream side flow path IC1, a downstream side flow path 102, and a turn-around flow path 103 that connects the upstream side flow path IC1 and the downstream side flow path 102.

Specifically, in the present embodiment, the air intake port 22a and the connecting port 22i are substantially arranged in the up-down direction, as illustrated in FIG. 10. The first flow path wall 46 erected toward the second member 34 is provided on a portion of an inner surface 32c of the first member 32, that is, the inner wall portion 40 between the air intake port 22a and the connecting port 22i. The first flow path wall 46 includes a first inner guide wall 32d, a second inner guide wall 32f, and a third inner guide wall 32q.

The second flow path wall 56 erected toward the first member 32 is provided on a portion of an inner surface 34c of the second member 34, that is, the outer wall portion 50. The second flow path wall 56 includes a first outer guide wall 34k, a second outer guide wall 34l, and a third outer guide wall 34m. The second flow path wall 56 is constituted by two ridges 57 extending along an extending direction, and the first flow path wall 46 is located between two of the ridges 57 in a state where the second member 34 is attached to the first member 32. That is, the first flow path wall 46 is fitted into a groove portion 57a formed between the ridges 57 of the second flow path wall 56 to form a flow path wall forming the internal flow path IC.

Referring also to an enlarged view of FIG. 14, the second member 34 further includes guide projections 58 erected higher than the second flow path wall 56 toward the first member 32 at several locations where the second flow path wall 56 is formed on the inner surface 34c of the outer wall portion 50. A pair of the guide projections 58 are provided in a direction orthogonal to an extending direction of two of the ridges 57. According to the present embodiment, the guide projections 58 are provided at two locations of the first outer guide wall 34k and one location of the third outer guide wall 34m.

According to the guide projection 58, when the second member 34 is attached to the first member 32, insertion of the first flow path wall 46 into the second flow path wall 56, that is, between a pair of the ridges 57 can be guided by the guide projection 58 higher than the ridge 57. With this arrangement, it is possible to facilitate assembling work of the first flow path wall 46 and the second flow path wall 56, which are difficult to visually recognize because of being located on an inner side of the chamber body 22, and assemblability of the chamber body 22 is improved.

A top portion of the first inner guide wall 32d contacts the inner surface 34c in the groove portion 57a of the second member 34, that is, the outer wall portion 50. A proximal end 32e (an end closer to the air intake port 22a) of the first inner guide wall 32d is located at an upper end of the connecting port 22i. The first inner guide wall 32d extends in an arc shape upward and backward from the upper end of the connecting port 22i. The first outer guide wall 34k is similarly configured, and extends in an arc shape along the first inner guide wall 32d. The upstream side flow path IC1 is formed above the first inner guide wall 32d and the first outer guide wall 34k.

Further, the second inner guide wall 32f is located below the first inner guide wall 32d, and is in contact with the inner surface 34c in the groove portion 57a of the second member 34, that is, the outer wall portion 50. A proximal end 32g (an end closer to the connecting port 22i) of the second inner guide wall 32f is located at a lower end of the connecting port 22i. The second inner guide wall 32f extends upward and backward from the lower end of the connecting port 22i. The second outer guide wall 34l is similarly configured and extends along the second inner guide wall 32f. The downstream side flow path IC2 is formed between the second inner guide wall 32f and the second outer guide wall 34l, and the first inner guide wall 32d and the first outer guide wall 34k.

The third inner guide wall 32q connects the proximal end 32e of the first inner guide wall 32d and the proximal end 32g of the second inner guide wall 32f. The connecting port 22i is provided to penetrate the third inner guide wall 32q. The third outer guide wall 34m extends along the third inner guide wall 32q and connects a proximal end of the first outer guide wall 34k and a proximal end of the second outer guide wall 34l.

Accordingly, the upstream side flow path IC1 and the downstream side flow path IC2 extend from the air intake port 22a and the connecting port 22i, respectively, in substantially the same direction with the first guide wall 32d interposed therebetween. That is, the downstream side flow path IC2 extends at least in the direction in which the upstream side flow path IC1 extends.

As illustrated in FIGS. 10 and 11, the first guide wall 32d does not extend to the frame-shaped outer wall portion 32b of the first member 32. That is, a distal end 32h (an end farther from the air intake port 22a) of the first guide wall 32d is separated from the frame-shaped outer wall portion 32b. This forms the turn-around flow path IC3 that connects a distal end (an end farther from the air intake port 22a) of the upstream side flow path IC1 and a distal end (an end farther from the connecting port 22i) of the downstream side flow path IC2.

Through such an internal flow path IC, that is, the upstream side flow path IC1, the downstream side flow path IC2, and the turn-around flow path IC3, outside air flowing into the air intake port 22a flows backward, turns around at the distal end 32h of the first guide wall 32d, and then flows forward toward the connecting port 22i, as indicated by the thick dashed arrow in FIGS. 10 and 11. Then, the outside air that has turned around flows out from the connecting port 22i and flows into the connecting pipe 24 connected to the connecting portion 22b.

By the internal flow path IC through which the outside air turns around, foreign substances contained in the outside air are separated from the outside air. A dust catching space S in which the separated foreign substances are temporarily stored is provided in the chamber body 22.

In the present embodiment, the dust catching space S is provided below the downstream side flow path IC2 and the turn-around flow path IC3. That is, the dust catching space S is located above a lowest portion of the frame-shaped outer wall portion 32b of the first member 32 and a lowest portion of the frame-shaped outer wall portion 34b of the second member 34 engaged with the first member 32.

When the outside air turns substantially by 180 degrees in the turn-around flow path IC3, foreign substances accompanying the outside air are separated from the outside air by centrifugal force and gravity. The separated foreign substances fall into the dust catching space S below the turn-around flow path IC3. Further, the outside air flowing through the downstream side flow path IC2 flows at a lower flow velocity than a flow velocity in the upstream side flow path IC1 due to the turn at the turn-around flow path IC3. As a result, the foreign substances accompanying the outside air fall into the dust catching space S below downstream side flow path IC2 due to gravity. The foreign substances accumulated in the dust catching space S can be removed by removing the second member 34 from the first member 32.

According to such a chamber body 22, foreign substances can be removed from the outside air without gradually reducing air intake efficiency, unlike a filter that is clogged with foreign substances. That is, no filter is needed for the air intake conduit 20 due to the chamber body 22. Note that the chamber body 22 and a filter may be used in combination.

In order to improve efficiency of removing foreign substances by the chamber body 22, a flow path cross-sectional area of the internal flow path IC (the upstream side flow path IC1, the downstream side flow path IC2, and the turn-around flow path IC3) is preferably larger than opening areas of the air intake port 22a and the connecting port 22i. Accordingly, the flow velocity of the outside air flowing into the chamber body 22 decreases in the chamber body 22, and foreign substances accompanying the outside air can be easily separated from the outside air in the chamber body 22. As a result, foreign substances are less likely to pass through the connecting port 22i and to enter the connecting pipe 24, that is, the air cleaner 18.

In order to keep foreign substances from entering the connecting pipe 24, that is, the air cleaner 18, a distal end of the downstream side flow path IC3 (a portion between the distal end 32h of the first guide wall 32d and a distal end 32i of the second guide wall 32f) is preferably located above the dust catching space S, as illustrated in FIGS. 10 and 11. As a result, foreign substances once stored in the dust catching space S are less likely to flow into the downstream side flow path IC3, thereby keeping foreign substances from entering the air cleaner 18 via the connecting pipe 24.

Further, the chamber body 22 preferably includes a drainage flow path DC for draining water stored in the dust catching space S. The drainage flow path DC is opened at a lower part of the chamber body 22. As illustrated in FIG. 11, the drainage flow path DC communicates with the outside of the chamber body 22 and the dust catching space S and is constituted by a gap between the connecting portion 22b and the frame-shaped outer wall portion 32b. The drainage flow path DC keeps water from accumulating in the chamber body 22.

According to the present embodiment described above, it is possible to keep foreign substances such as mud and water from entering the air intake port that sucks in outside air for driving the engine.

The utility vehicle 10 according to the embodiment described above has the advantageous effects described below.

(1) The utility vehicle 10 includes:
the body 12;
the frame 14 that supports the body 12;
the engine 16 mounted on the frame 14 and to which outside air is supplied;
the chamber body 22 having the intake space Q defined inside, the chamber body 22 being divided into two in the vehicle width direction into the first member 32 disposed inwardly in the vehicle width direction and opened outwardly in the vehicle width direction and the second member 34 detachably attached to the first member 32 from an outer side in the vehicle width direction and opened inwardly in the vehicle width direction, the second member 34 having the engaging claw 34a, and the first member 32 having the engaging portion 32a engaged with the engaging claw 34a; and
the connecting pipe 24 that connects the chamber body 22 and the engine 16.

The first member 32 includes the first frame-shaped outer wall portion 32b defining a region on an inner side in the vehicle width direction in the intake space Q, the first tip surface 32k that is an outer end surface in the vehicle width direction of the first frame-shaped outer wall portion 32b, and the tip protrusion 32l protruding from the first tip surface 32k outwardly in the vehicle width direction, and the second member 34 includes the second frame-shaped outer wall portion 34b defining a region on an outer side in the vehicle width direction in the intake space Q, the second tip surface 34d that is an inner end surface in the vehicle width direction of the second frame-shaped outer wall portion 34b, and the tip recess 34g recessed from the second tip surface 34d outwardly in the vehicle width direction and fittable to the tip protrusion 32l.

As a result, the tip protrusion 32l is fitted into the tip recess 34g, so that a crank-like joint surface is formed between the first member 32 and the second member 34. With this arrangement, foreign matter such as dust or water is likely to be prevented from entering from a gap between the first member 32 and the second member 34. Therefore, it is possible to secure sealability between the first member 32 and the second member 34 without separately providing a sealing member between the first member and the second member. Therefore, while the chamber body 22 is constituted by the first member 32 and the second member 34 divided into two, it is possible to secure sealability between the two members while reducing increase in cost.

(2) The tip protrusion 32l and the tip recess 34g may be located at an end portion closer to an inner peripheral surface of the first tip surface 32k and the second tip surface 34d.

As a result, since the tip protrusion 32l and the tip recess 34g are located adjacent to the intake space Q, it is easy to secure sealability between them as compared with a case where they are located at an end portion closer to an outer peripheral surface and are away from the intake space Q.

(3) The second member 34 may have the guide 34e that protrudes toward the first member 32 and extends along an inner peripheral surface of the first member 32.

As a result, the first frame-shaped outer wall portion 32b and the second frame-shaped outer wall portion 34b are easily aligned by the guide 34e, and have excellent assemblability. For example, in a case where the chamber body 22 is formed by resin molding, even if both or one of the first frame-shaped outer wall portion 32b and the second frame-shaped outer wall portion 34b is deformed due to a sink mark formed at the time of molding, it is easy to align them by the guide 34e.

(4) The guide 34e may be located in the second member 34 having the engaging claw 34a of the first member 32 and the second member 34, and may be adjacent to a circumferential direction of a position corresponding to the engaging claw 34a on an inner peripheral surface of the second member 34.

As a result, the guide 34e is located so as to be adjacent to a portion where position displacement is likely to occur due to pressing from an outer peripheral surface toward an inner peripheral surface side by the engaging claw 34a. Therefore, since a periphery of the engaging portion 32a can be supported in a radial direction by the guide 34e, it is easy to reliably align the first member 32 and the second member 34.

(5) The guide 34e may be adjacent to both sides in a circumferential direction of a position corresponding to the engaging claw 34a on an inner peripheral surface of the second member 34.

As a result, since a pair of the guides 34e are located on both sides of the engaging claw 34a in a manner corresponding to the engaging claw 34a, a periphery of the engaging portion 32a can be supported in a radial direction from both sides in a circumferential direction by a pair of the guides 34e, so that the first member 32 and the second member 34 can be more easily aligned.

(6) The guide 34e may have the inclined slope surface 34f in a portion facing an inner peripheral surface of the first member 32.

As a result, with the guide 34e, when the second member 34 is attached to the first member 32, the first frame-shaped outer wall portion 32b is easily gradually guided as the first frame-shaped outer wall portion 32b and the second frame-shaped outer wall portion 34b are brought close to each other so as to be aligned with each other.

(7) The chamber body 22 may include the intake port 22a communicating with the intake space Q, the connecting port 22i to which the connecting pipe 24 is connected, and the internal flow path IC connecting the intake port 22a and the connecting port 22i, the first member 32 may have the first flow path wall 46 protruding toward the second member 34 and defining the internal flow path IC, and the second member 34 may have the groove portion 57a into which the first flow path wall 46 is fitted, and the groove portion 57a may have a pair of the ridges 57 and the guide projection 58 higher than a pair of the ridges 57.

As a result, in the intake space Q that is located inside the chamber body 22 and thus is hardly visible when the second member 34 is attached to the first member 32, the first flow path wall 46 is easily guided by the guide projection 58 and fitted into the groove portion 57a, and the internal flow path IC is easily configured.

(8) The first member 32 may be fixed to the frame 14.

As a result, since the first member 32 is fixed to the frame 14, it is not necessary to separately support the first member 32 when the second member 34 is attached to the first member 32. Therefore, the second member 34 is easily attached to and detached from the first member 32.

(9) The first member 32 may be located inwardly in the vehicle width direction, and the second member 34 may be located outwardly in the vehicle width direction with respect to the first member 32.

As a result, the second member 34 can be easily assembled to the first member 32 from an outer side in the vehicle width direction.

(10) The first member 32 may have higher rigidity than the second member 34.

As a result, since the second member 34 having relatively low rigidity is attached to the first member 32 having relatively high rigidity, it is easy to assemble the second member 34 by deforming the second member 34 along the first member 32 when assembling the second member 34 to the first member 32.

(11) The second member 34 may be formed substantially flush with the side surface 12d of the body 12.

As a result, since a part of a design surface of a vehicle can be constituted by the second member 34, it is not necessary to provide another member for covering the chamber body 22 from an outer side in the vehicle width direction.

(12) In a vehicle side view, an outer shape of the second member may be larger than an outer shape of the first member 32.

As a result, since the first member 32 is covered by the second member 34, the first member 32 is not visible from an outer side in the vehicle width direction, and the appearance is excellent. For example, even in a case where the first member is formed of a material in which a resin molding mark is easily noticeable, deterioration in appearance of a vehicle is reduced as the second member 34 is formed of a material in which a resin molding mark is less noticeable than another member.

(13) In a direction orthogonal to the vehicle width direction, the outer width dimension X1 between a pair of the tip protrusions 32l located on both sides with the center position 32p of the first member 32 interposed between them may be larger than the outer width dimension X2 between a pair of the tip recesses 34g located on both sides with the center position 34j of the second member 34 interposed between them.

As a result, it is easier to secure sealability between the tip protrusion 32l and the tip recess 34g.

(14) According to another aspect of the present disclosure, there is provided the chamber body 22 that has the intake space Q defined inside and supplies outside air taken into the intake space Q to the engine 16 mounted on a vehicle, the chamber body 22 being divided into two in the vehicle width direction into the first member 32 disposed inwardly in the vehicle width direction and opened outwardly in the vehicle width direction and the second member 34 detachably attached to the first member 32 from an outer side in the vehicle width direction and opened inwardly in the vehicle width direction, the second member 34 having the engaging claw 34a for engaging both of them, and the first member 32 having the engaging portion 32a engaged with the engaging claw 34a.

The first member 32 includes the first frame-shaped outer wall portion 32b defining a region on an inner side in the vehicle width direction in the intake space Q, the first tip surface 32k that is an outer end surface in the vehicle width direction of the first frame-shaped outer wall portion 32b, and the tip protrusion 32l protruding from the first tip surface 32k outwardly in the vehicle width direction, and the second member 34 includes the second frame-shaped outer wall portion 34b defining a region on an outer side in the vehicle width direction in the intake space Q, the second tip surface 34d that is an inner end surface in the vehicle width direction of the second frame-shaped outer wall portion 34b, and the tip recess 34g recessed from the second tip surface 34d outwardly in the vehicle width direction and fittable to the tip protrusion 32l.

Although the present disclosure is described above with reference to the above embodiment, the embodiment of the present disclosure is not limited to this.

In the above embodiment, the chamber body 22 is divided in the vehicle width direction into the first member 32 and the second member 34, but the present disclosure is not limited to this. The chamber body 22 may be divided into two in the vehicle body front-rear direction, the vehicle body up-down direction, or an optional direction. Even in this case, the tip protrusion 32l only needs to be provided on one of the first member 32 and the second member 34, and the tip recess 34g only needs to be provided on another member so as to fit both of the members to each other.

Further, in the above embodiment, the first member 32 is provided with the engaging portion 32a, and the second member 34 is provided with the engaging claw 34a. However, the present disclosure is not limited to this. The first member 32 may be provided with an engaging claw, and the second member 34 may be provided with an engaging portion. Even in this case, the second member 34 can be attached to the first member 32.

Further, in the above embodiment, the guide 34e is provided in the second member 34, but the present disclosure is not limited to this. A guide may be provided in the first member 32. Even in this case, when the second member 34 is attached to the first member 32, the second member 34 is easily aligned with the first member 32 while being guided by the guide.

Further, in the above embodiment, the first flow path wall 46 is provided in the first member 32, the second flow path wall 56 constituting the groove portion 57a is provided in the second member 34, and the first flow path wall 46 is fitted into the second flow path wall 56 (groove portion 57a), but the present disclosure is not limited to this. The first member 32 may be provided with a first flow path wall so as to form a groove portion, and the second member 34 may be provided with a second flow path wall fitted into the first flow path wall (groove portion). Even in this case, the internal flow path IC can be configured in the chamber body 22.

Further, in the above embodiment, the first member 32 is fixed to the rear side pipe frame 14a, but the present disclosure is not limited to this. The second member 34 may be fixed to the frame 14, and the first member 32 may be attached to the second member 34. Even in this case, it is not necessary to separately support the second member 34, and the first member 32 can be easily assembled to the second member 34.

For example, in the above embodiment, an engine that requires outside air for driving is exemplified as an on-board device that requires outside air, but the embodiment of the present disclosure is not limited to this. For example, the on-board device may be any of various devices such as a continuously variable transmission that requires outside air for cooling. Further, in a case where the utility vehicle travels by a drive source other than an engine, for example, by a motor, the motor may be cooled by outside air. That is, in the embodiment of the present disclosure, usage of the outside air does not matter. For this reason, in the embodiment of the present disclosure, the on-board device is a device that requires outside air.

Further, in the above embodiment, the chamber body of the air intake conduit is provided on a side surface of the body of the utility vehicle, but the embodiment of the present disclosure is not limited to this. The position of the chamber body may be any position as long as the air intake port of the chamber body can suck in outside air.

Further, in the above embodiment, the air intake port 22a is located above the connecting port 22i in the chamber body 22, as illustrated in FIG. 10. For this reason, the internal flow path IC of the chamber body 22 is a flow path in which outside air (thick dashed line) that has passed through the air intake port 22a once flows backward and turns back toward the connecting port 22i. However, the embodiment of the present disclosure is not limited to this. The internal flow path IC of the chamber body through which outside air flows only needs to be the internal flow path IC that allows foreign substances accompanying the outside air to be separated from the outside air. Therefore, the shape and a flow path cross-sectional area of the internal flow path IC and the positions of the air intake port and the connecting port are not limited. Also, the number of air intake ports is not limited to one. In addition, directions of flow before and after outside air turns around in the internal flow path IC are not limited.

Furthermore, in the above embodiment, the air intake conduit includes a chamber body including an air intake port and is connected to an on-board device, that is, an engine via an air cleaner. However, the embodiment of the present disclosure is not limited to this. The chamber body and the air cleaner can be omitted if the air intake port is provided so as to substantially prevent foreign substances from entering.

That is, the embodiment according to the present disclosure is, in a broad sense, a utility vehicle that includes a body, a frame that supports the body, an on-board device that is mounted on the frame and requires outside air, and an air intake conduit connected to the on-board device, in which an air intake port of the air intake conduit that sucks in outside air faces a center side of the utility vehicle. In this case, the center side of the utility vehicle is a direction from an outer side inwardly of the utility vehicle and includes not only the vehicle width direction in the above embodiment but also the up-down direction and the front-rear direction of the vehicle body.

As described above, the embodiment is described as an example of the technique in the present disclosure. For this purpose, the accompanying drawings and detailed description are provided. Therefore, the constituent elements described in the attached drawings and the detailed description include not only constituent elements essential for solving the problem but also constituent elements that are not essential for solving the problem in order to exemplify the technique. Therefore, it should not be determined that such constituent elements that are not essential are essential just because such constituent elements are described in the accompanying drawings or detailed description.

Further, since the above embodiment is for exemplifying the technique of the present disclosure, various changes, replacements, additions, omissions, and the like can be made within the scope of claims or a scope equivalent to the scope of claims.

What is claimed is:

1. A utility vehicle comprising:
   a body;
   a frame supporting the body;
   an on-board device mounted on the frame and to which outside air is supplied;
   a chamber body having an intake space defined therein, the chamber body being separable in a first direction into a first member on a first side of the chamber body in the first direction and opened to a second side opposite to the first side, and a second member detachably attached to the first member from the second side and opened to the first side, a first one of the first member and the second member having an engaging claw for connecting the first member and the second member, and a second one of the first member and the second member having an engaging portion to be engaged with the engaging claw; and
   a connecting pipe connecting the chamber body and the on-board device,
   wherein the first member includes a first frame-shaped outer wall portion defining a region on the first side in the intake space, a first tip surface that isforming an end surface at the second side of the first frame-shaped outer wall portion, and a tip protrusion protruding from the first tip surface te-toward the second side,
   wherein the second member includes a second frame-shaped outer wall portion defining a region on the second side in the intake space, a second tip surface forming an end surface at the first side of the second frame-shaped outer wall portion, and a tip recess recessed from the second tip surface toward the second side and fittable to the tip protrusion,
   wherein the engaging claw has a claw portion extending in a second direction perpendicular to the first direction and towards an interior of the chamber body, and the engaging portion has a recess also extending in the second direction, and
   wherein the claw portion of the engaging claw is fitted into the recess of the engaging portion in a direction towards the interior of the chamber body when the engaging claw detachably engages the engaging portion.

2. The utility vehicle according to claim 1, wherein the tip protrusion and the tip recess are located at an end portion closer to an inner periphery of the first tip surface of the first frame-shaped outer wall portion and to an inner periphery of the second tip tip surface of the second frame-shaped outer wall portion, respectively, than to an outer periphery of the first tip surface of the first frame-shaped outer wall portion and to an outer periphery of the second tip tip surface of the second frame-shaped outer wall portion, respectively.

3. The utility vehicle according to claim 1, wherein the first one of the first member and the second member has a guide protruding toward to the second one of the first member and the second member and extending along an inner peripheral surface of the second one.

4. The utility vehicle according to claim 3, wherein the guide is located on the first one of the first member and the second member having the engaging claw, and is adjacent to a circumferential position of the engaging claw on the inner peripheral surface.

5. The utility vehicle according to claim 4, wherein, the guide is adjacent to the circumferential position of the engaging claw on the inner peripheral surface at both sides of the chamber body.

6. The utility vehicle according to claim 3, wherein the guide has an inclined slope in a portion facing the inner peripheral surface.

7. The utility vehicle according to claim 1, wherein:
the chamber body includes an air intake port communicating with the intake space, a connecting port to which the connecting pipe is connected, and an internal flow path connecting the air intake port and the connecting port,
a walled one of the first member and the second member has a flow path wall protruding toward a grooved one of the first member and the second member and defining the internal flow path, and the grooved one of the first member and the second member has a groove portion into which the flow path wall is fitted, and
the groove portion has a pair of ridges and a guide projection higher than the pair of ridges.

8. The utility vehicle according to claim 1, wherein one of the first member and the second member is fixed to the frame.

9. The utility vehicle according to claim 8, wherein:
the predetermined first direction is a vehicle width direction,
the one of the first member and the second member is a center one of the first member and the second member located on a center side in the vehicle width direction, and
an outer one of the first member and the second member is located outwardly in the vehicle width direction with respect to the center one of the first member and the second member.

10. The utility vehicle according to claim 9, wherein the first member has higher rigidity than the second member.

11. The utility vehicle according to claim 9, wherein the outer one of the first member and the second member is substantially flush with the body.

12. The utility vehicle according to claim 9, wherein an outer shape of the outer one of the first member and the second member is larger than an outer shape of the center one of the first member and the second member at a mating portion where the first member and the second member are attached to each other in a vehicle side view.

13. The utility vehicle according to claim 1, wherein an outer width dimension of the tip protrusion is larger than an outer width dimension of the tip recess in a direction orthogonal to the predetermined direction.

14. A chamber body having an intake space defined inside therein and configured to supply outside air taken into the intake space to an on-board device,
the chamber body being separable in a first direction into;
a first member disposed on a first side of the chamber body in the predetermined first direction and opened to a second side opposite to the first side, and
a second member detachably attached to the first member from the second side and opened to the first side,
wherein a first one of the first member and the second member has an engaging claw for connecting the first member and the second member, and a second one of the first member and the second member having an engaging portion to be engaged with the engaging claw,
wherein the first member includes a first frame-shaped outer wall portion defining a region on the first side in the intake space, a first tip surface forming an end surface at the second side of the first frame-shaped outer wall portion, and a tip protrusion protruding from the first tip surface toward the second side, and
wherein the second member includes a second frame-shaped outer wall portion defining a region on the second side in the intake space, a second tip surface forming an end surface at the first side of the second frame-shaped outer wall portion, and a tip recess recessed from the second tip surface toward the second side and fittable to the tip protrusion,
wherein a claw portion of the engaging claw extends in a second direction perpendicular to the first direction and towards an interior of the chamber body, and the engaging portion has a recess also extending in the second direction, and
wherein the claw portion of the engaging claw is fitted into the recess of the engaging portion in a direction towards the interior of the chamber body when the engaging claw detachably engages the engaging portion.

15. A utility vehicle comprising:
a body;
a frame supporting the body;
an on-board device mounted on the frame and to which outside air is supplied;
a chamber body having an intake space defined therein, the chamber body being separable in a predetermined direction into a first member on a first side of the chamber body in the predetermined direction and opened to a second side opposite to the first side, and a second member detachably attached to the first member from the second side and opened to the first side, a first one of the first member and the second member having an engaging claw for connecting the first member and the second member, and a second one of the first member and the second member having an engaging portion to be engaged with the engaging claw; and
a connecting pipe connecting the chamber body and the on-board device,
wherein the first member includes a first frame-shaped outer wall portion defining a region on the first side in the intake space, a first tip surface forming an end surface at the second side of the first frame-shaped outer wall portion, and a tip protrusion protruding from the first tip surface toward the second side,
wherein the second member includes a second frame-shaped outer wall portion defining a region on the second side in the intake space, a second tip surface forming an end surface at the first side of the second frame-shaped outer wall portion, and a tip recess recessed from the second tip surface toward the second side and fittable to the tip protrusion,
wherein the chamber body includes:
an air intake port communicating with the intake space,
a connecting port to which the connecting pipe is connected, and
an internal flow path connecting the air intake port and the connecting port,
wherein a walled one of the first member and the second member has a flow path wall protruding toward a grooved one of the first member and the second member and defining the internal flow path, and a cover of the grooved one of the first member and the second member has a groove portion into which the flow path wall is fitted.

16. The utility vehicle according to claim 15, wherein the groove portion has a pair of ridges and a guide projection higher than the pair of ridges.

17. The utility vehicle according to claim 1, wherein the tip protrusion includes a protrusion inner surface flush with an inner peripheral surface of the first frame-shaped outer wall portion, and the tip recess is open towards an inner peripheral surface of the second frame-shaped outer wall portion.

* * * * *